US010961335B2

(12) United States Patent
Kim et al.

(10) Patent No.: US 10,961,335 B2
(45) Date of Patent: Mar. 30, 2021

(54) OLEFIN-BASED COPOLYMER AND PROCESS FOR PREPARING SAME

(71) Applicant: LG Chem, Ltd., Seoul (KR)

(72) Inventors: Seul Ki Kim, Daejeon (KR); Eun Jung Lee, Daejeon (KR); Choong Hoon Lee, Daejeon (KR); Ki Won Han, Daejeon (KR); Jae Kwon Jang, Daejeon (KR); Hyo Jung Han, Daejeon (KR); In Sung Park, Daejeon (KR)

(73) Assignee: LG Chem, Ltd.

( * ) Notice: Subject to any disclaimer, the term of this patent is extended or adjusted under 35 U.S.C. 154(b) by 210 days.

(21) Appl. No.: 16/307,319

(22) PCT Filed: Sep. 18, 2017

(86) PCT No.: PCT/KR2017/010160
§ 371 (c)(1),
(2) Date: Dec. 5, 2018

(87) PCT Pub. No.: WO2018/056655
PCT Pub. Date: Mar. 29, 2018

(65) Prior Publication Data
US 2019/0135963 A1 May 9, 2019

(30) Foreign Application Priority Data

Sep. 23, 2016 (KR) .................. 10-2016-0122446

(51) Int. Cl.
*C08F 210/16* (2006.01)
*C08F 4/642* (2006.01)
(Continued)

(52) U.S. Cl.
CPC .............. *C08F 210/16* (2013.01); *C08F 2/38* (2013.01); *C08F 4/642* (2013.01); *C08F 4/646* (2013.01);
(Continued)

(58) Field of Classification Search
None
See application file for complete search history.

(56) References Cited

U.S. PATENT DOCUMENTS 5,064,802 A   11/1991   Stevens et al.
6,306,973 B1  10/2001   Takaoka et al.
(Continued)

FOREIGN PATENT DOCUMENTS

JP   H09278953 A   10/1997
JP   2002187245 A   7/2002
(Continued)

OTHER PUBLICATIONS

Extended European Search Report including Written Opinion for Application No. EP17853370.9 dated Jun. 3, 2019.
(Continued)

*Primary Examiner* — Fred M Teskin
(74) *Attorney, Agent, or Firm* — Lerner, David, Littenberg, Krumholz & Mentlik, LLP

(57) ABSTRACT

The present invention relates to an olefin-based copolymer having novel crystalline properties and capable of providing a molded article with further improved strength and impact strength when compounded with other resins, and a method for preparing the same. The olefin-based copolymer is an olefin-based copolymer comprising an ethylene repeating unit and an α-olefinic repeating unit. The olefin-based copolymer comprises polymer fractions defined by three different peaks at a predetermined temperature when analyzed by cross-fractionation chromatography.

20 Claims, 6 Drawing Sheets

(51) Int. Cl.
   *C08F 4/6592*   (2006.01)
   *C08F 2/38*     (2006.01)
   *C08F 4/646*    (2006.01)
   *C08F 4/659*    (2006.01)

(52) U.S. Cl.
   CPC .......... *C08F 4/65922* (2013.01); *C08F 4/659* (2013.01); *C08F 2420/02* (2013.01); *C08F 2500/01* (2013.01)

(56) References Cited

U.S. PATENT DOCUMENTS

| | | | |
|---|---|---|---|
| 8,288,470 | B2 | 10/2012 | Ansems et al. |
| 2003/0139546 | A1 | 7/2003 | Jain et al. |
| 2004/0054040 | A1 | 3/2004 | Lin et al. |
| 2007/0225158 | A1 | 9/2007 | Lee et al. |
| 2010/0029827 | A1 | 2/2010 | Ansems et al. |
| 2010/0152390 | A1 | 6/2010 | De Gracia et al. |
| 2012/0046373 | A1 | 2/2012 | Low et al. |
| 2013/0072646 | A1* | 3/2013 | Noh ............ C08F 210/14 526/114 |
| 2013/0345377 | A1 | 12/2013 | Ker et al. |
| 2015/0315314 | A1 | 11/2015 | Ker et al. |
| 2017/0218105 | A1 | 8/2017 | Kim et al. |
| 2020/0010657 | A1 | 1/2020 | Kim et al. |

FOREIGN PATENT DOCUMENTS

| | | |
|---|---|---|
| JP | 2009501267 A | 1/2009 |
| JP | 2009173029 A | 8/2009 |
| JP | 4813197 B2 | 11/2011 |
| JP | 5767203 B2 | 8/2015 |
| KR | 100820542 B1 | 4/2008 |
| KR | 20090091346 A | 8/2009 |
| KR | 20100102854 A | 9/2010 |
| KR | 20110118955 A | 11/2011 |
| KR | 101310239 B1 | 9/2013 |
| KR | 20150027235 A | 3/2015 |
| KR | 20160061107 A | 5/2016 |
| WO | 9914271 A1 | 3/1999 |

OTHER PUBLICATIONS

Search report from International Application No. PCT/KR2017/010160, dated Mar. 29, 2018.
Search report from International Application No. PCT/KR2017/010161, dated Dec. 27, 2017.

* cited by examiner

[FIG. 1]
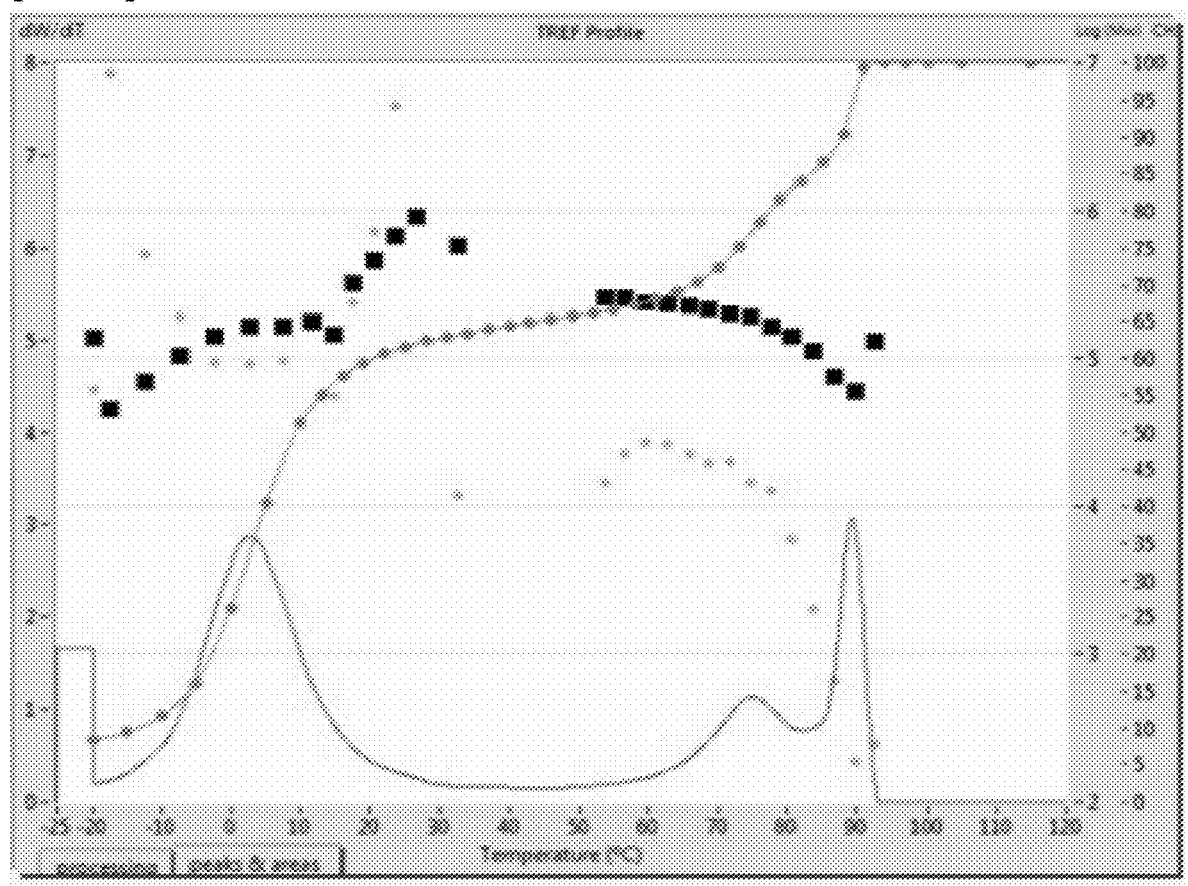

[FIG. 2]
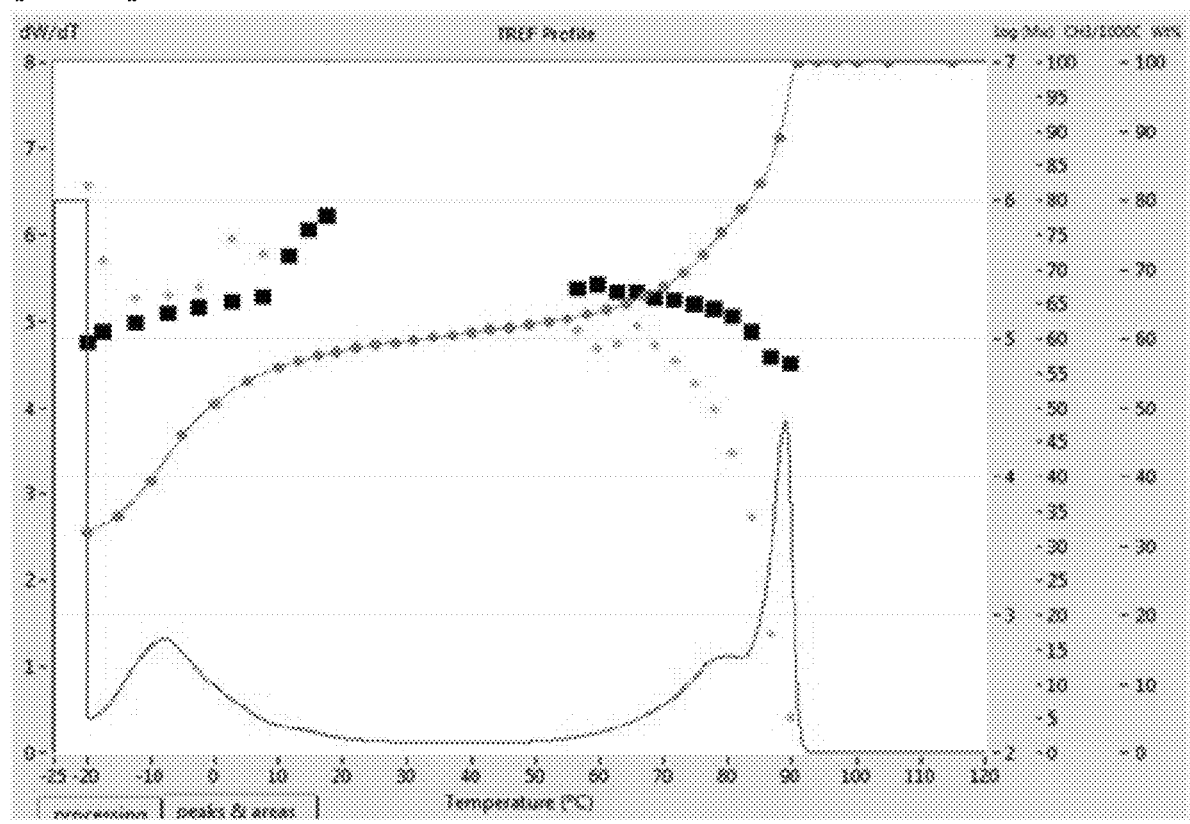

[FIG. 3]
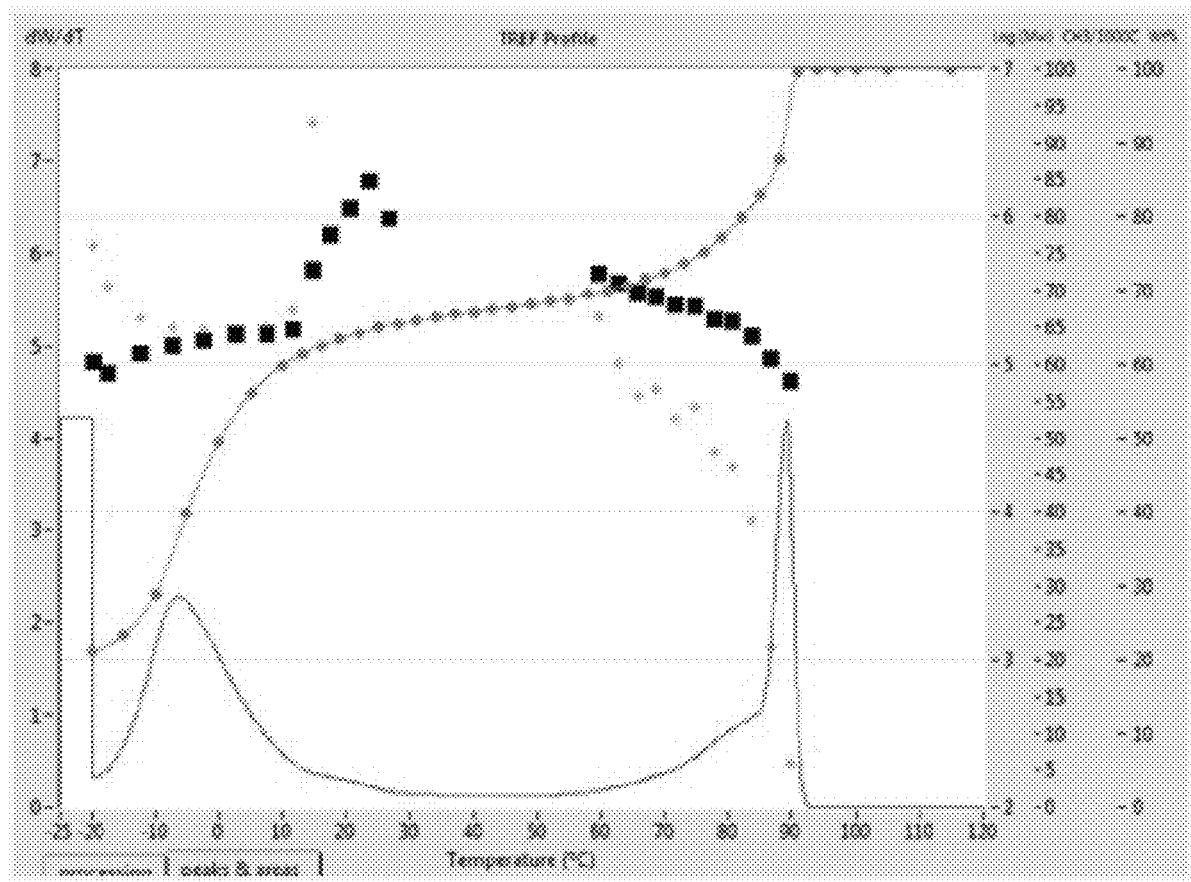

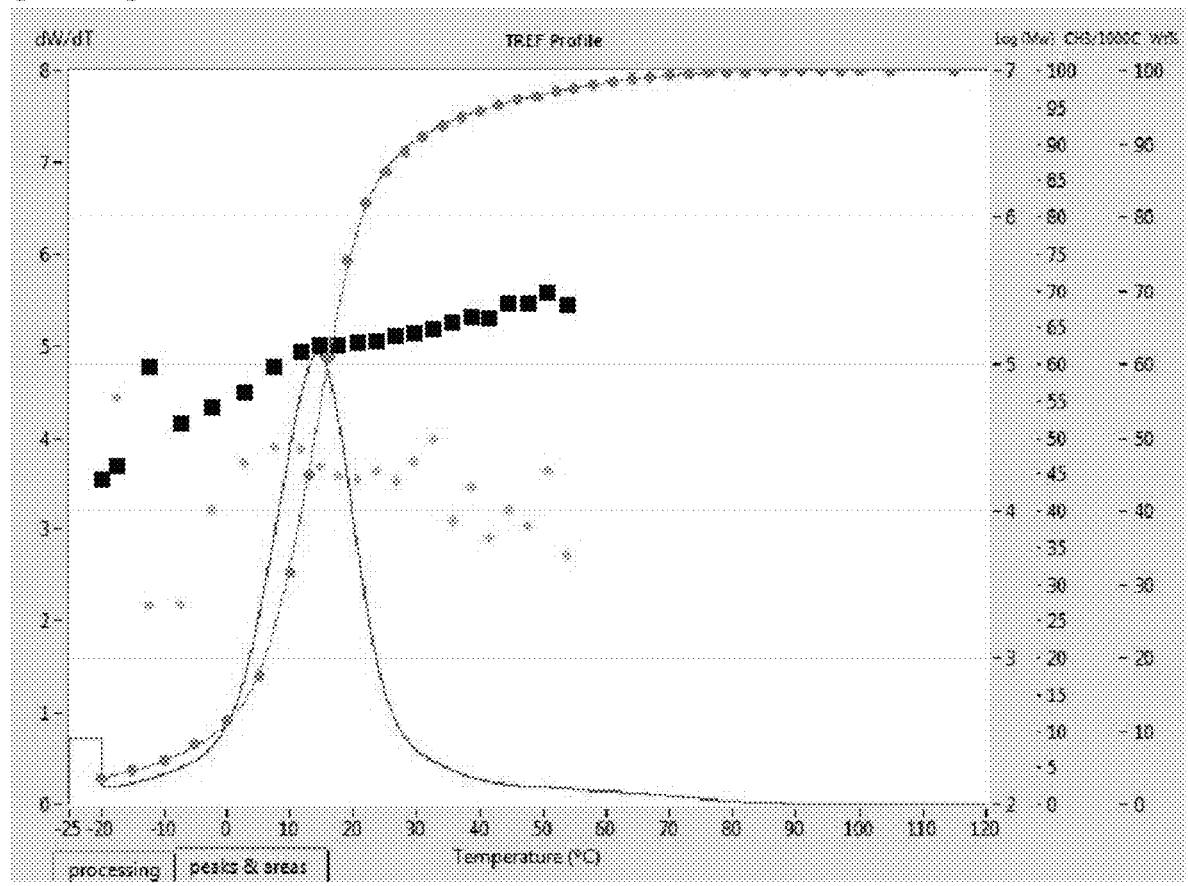
[FIG. 4]

[FIG. 5]
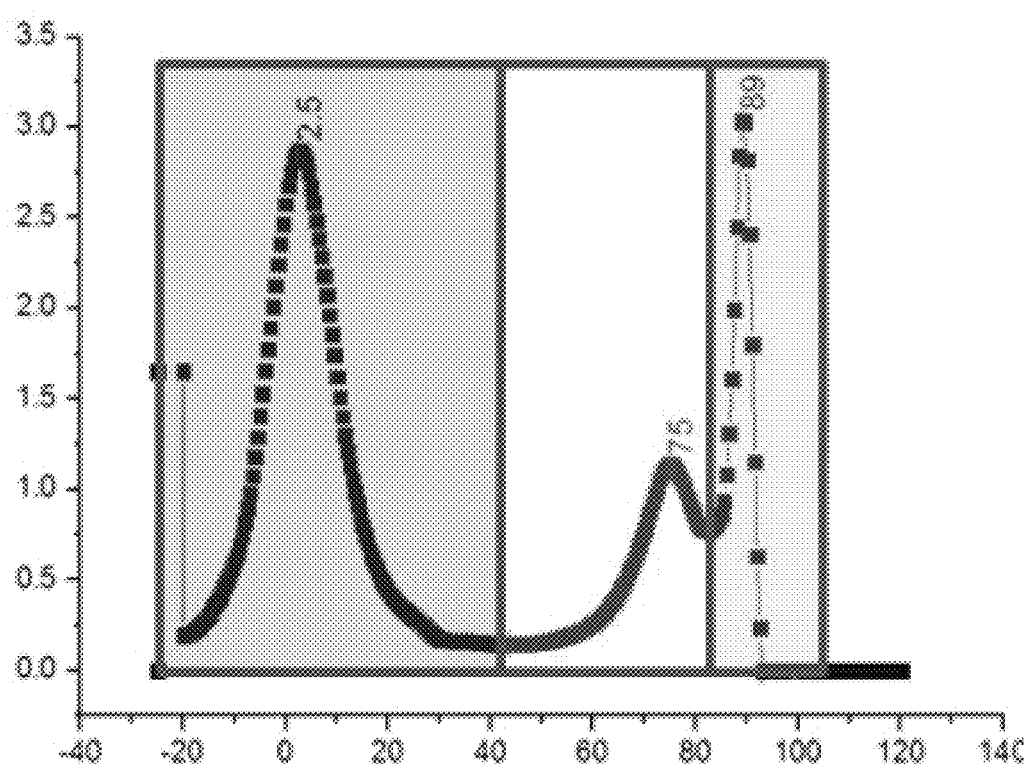

[FIG. 6]
wt % 
wt % interpolated 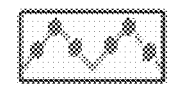
dW/dT 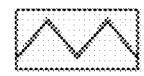
Log (Mw) 
CH3/1000C 

OLEFIN-BASED COPOLYMER AND PROCESS FOR PREPARING SAME

CROSS-REFERENCE TO RELATED APPLICATIONS

The present application is a national phase entry under 35 U.S.C. § 371 of International Application No. PCT/KR2017/010160 filed Sep. 18, 2017, which claims priority from Korean Patent Application No. 10-2016-0122446 filed Sep. 23, 2016, all of which are incorporated herein by reference.

TECHNICAL FIELD

The present invention relates to an olefin-based copolymer having novel crystalline properties and capable of providing a molded article with further improved strength and impact strength when compounded with other resins, and a process for preparing the same.

BACKGROUND

In the early 1990s, Dow Chemical Company disclosed [Me$_2$Si(Me$_4$C$_5$)NtBu]TiCl$_2$ (Constrained-Geometry Catalyst, hereinafter abbreviated as CGC) in U.S. Pat. No. 5,064,802, and the superiority of CGC in the copolymerization reaction of ethylene and alpha-olefin compared to existing metallocene catalysts known in the art may be largely summarized into two points as follows:

(1) A polymer having a high molecular weight while exhibiting high activity even at a high polymerization temperature is produced, and (2) copolymerizability of alpha-olefin having high steric hindrance such as 1-hexene and 1-octene is highly superior.

In addition to these, the copolymer produced by using the CGC catalyst is known to have excellent mechanical properties, such as strength, because the content of a portion having a low molecular weight is lower than that of the copolymer prepared by using a conventional Ziegler-Matta catalyst.

Due to the advantages of the olefin-based copolymer such as ethylene-alpha-olefin copolymer obtained by using a metallocene catalyst such as the CGC catalyst, application of such metallocene olefin-based copolymers to various fields and uses has been attempted recently. As an embodiment of such olefin-based copolymer, several attempts have been made to apply an olefin-based elastomer, which is mainly a random copolymer of an ethylene-alpha-olefin, to various uses for replacing rubber materials and the like.

However, the conventional olefin-based copolymers, particularly olefin-based elastomers have basically a single crystal structure. Therefore, it is known that it is not easy to simultaneously achieve required properties such as compatibility with other resins, strength and impact strength. For example, when existing olefin-based copolymers or olefin-based elastomers are compounded with polypropylene or the like to obtain a molded article exhibiting excellent impact strength and strength, it is necessary to use an olefin elastomer having a relatively low density in order to improve the impact strength of the molded article. However, since these low density olefin-based elastomers exhibit a relatively low strength, they have drawbacks such as difficulty in achieving excellent strength of the overall molded article thereof.

Accordingly, there is a continuing demand the development of a novel olefin-based copolymer capable of providing a molded article which simultaneously improves various physical properties such as strength and impact strength, even when used singly or compounded with other resins.

Technical Problem

The present invention provides an olefin-based copolymer having novel crystalline properties and capable of providing a molded article with more improved strength and impact strength when compounded with other resins, and a method for preparing the same.

Technical Solution

The present invention provides an olefin-based copolymer comprising an ethylene repeating unit and an α-olefin-based repeating unit, wherein when the olefin-based copolymer is analyzed by cross-fractionation chromatography (CFC), it includes a first fraction defined as a first peak appearing at a first elution temperature (Te1) of −20"C. to 50° C., a second fraction defined as a second peak appearing at a second elution temperature (Te2) of 50° C. to 85° C., and a third fraction defined as a third peak appearing at a third elution temperature (Te3) higher than that of the second elution temperature (Te2), for example, at a temperature of 85° C. to 130° C.

In the olefin-based copolymer contained the resin composition, the fraction ratio of the second fraction defined by the integral area of the second peak is 7 to 25%, or the second fraction of the olefin-based copolymer may have the number of short-chain branches (SCB) per 1,000 carbon atoms than 50.

The present invention also provides a method for preparing the olefin-based copolymer comprising copolymerizing ethylene and α-olefin in the presence of a catalyst composition comprising a first metallocene catalyst including a compound of the following Chemical Formula 1 and a second metallocene catalyst including a compound of the following Chemical Formula 2:

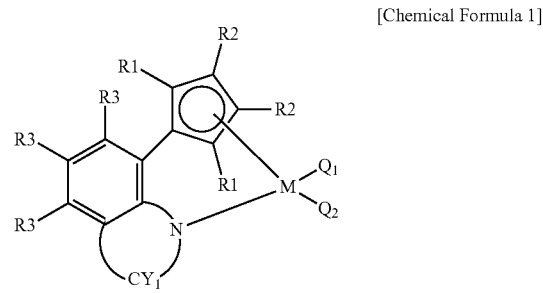

[Chemical Formula 1]

in Chemical Formula 1,

R1 and R2 are each independently hydrogen, an alkyl having 1 to 20 carbon atoms, an aryl having 6 to 20 carbon atoms, silyl, an alkenyl having 1 to 20 carbon atoms, an alkylaryl having 7 to 25 carbon atoms, an arylalkyl having 7 to 25 carbon atoms, or a metalloid radical of a Group 14 metal substituted with hydrocarbyl; the R1 and R2 may be connected to each other by an alkylidene radical containing an alkyl having 1 to 20 carbon atoms or an aryl having from 6 to 20 carbon atoms to form a ring;

each R3 is independently hydrogen, a halogen, an alkyl radical having 1 to 20 carbon atoms, an aryl radical having 6 to 20 carbon atoms, an alkoxy radical having 6 to 20 carbon atoms, an aryloxy radical, or an amido radical; two or more R3 of the R3 may be connected to each other to form an aliphatic or aromatic ring;

CY1 is a substituted or unsubstituted aliphatic or aromatic ring;

M is a Group 4 transition metal; and $Q_1$ and $Q_2$ are each independently a halogen, an alkyl radical having 1 to 20 carbon atoms, an aryl amido radical having 6 to 20 carbon atoms, an alkyl radical having 1 to 20 carbon atoms, an alkenyl radical having 1 to 20 carbon atoms, an aryl radical having 6 to 20 carbon atoms, an alkylaryl radical having 7 to 25 carbon atoms, an arylalkyl radical having 7 to 25 carbon atoms, or an alkylidene radical having 1 to 20 carbon atoms,

[Chemical Formula 2]

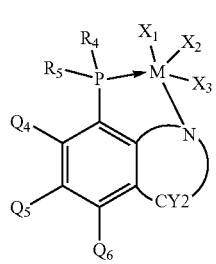

in Chemical Formula 2, $R_4$ and $R_5$ are each independently selected from the group consisting of an alkyl group having 1 to 20 carbon atoms which is substituted or unsubstituted with halogen, a cycloalkyl having 5 to 60 carbon atoms, an aryl having 6 to 60 carbon atoms, a cyclodiene group having 5 to 60 carbon atoms, an alkenyl having 2 to 20 carbon atoms, an alkylaryl having 7 to 60 carbon atoms and an arylalkyl having 7 to 60 carbon atoms;

$Q_4$ to $Q_6$ are each independently hydrogen or deuterium;

CY2 is an aliphatic ring having 5 to 20 carbon atoms which contains nitrogen and is substituted or unsubstituted with alkyl having 1 to 5 carbon atoms;

M is Groups 3-12 metal or lanthanide series metal; and $X_1$ to $X_3$ are the same as or different from each other and are each independently selected from the group consisting of a halogen radical, an alkylamido radical having 1 to 20 carbon atoms, an arylamido radical having 6 to 60 carbon atoms, an alkyl radical having 1 to 20 carbon atoms, an alkenyl radical having 2 to 20 carbon atoms, an aryl radical having 6 to 60 carbon atoms, an alkylaryl radical having 7 to 60 carbon atoms, an arylalkyl radical having 7 to 60 carbon atoms and an alkylidene radical having 1 to 20 carbon atoms.

DETAILED DESCRIPTION OF THE EMBODIMENTS

Hereinafter, olefin-based copolymer and a preparation method thereof according to embodiments of the present invention will be described in more detail. However, it will be apparent to those skilled in the art that this is presented as an example of the invention and the scope of the invention is not limited thereby, and that various modifications can be made to the embodiments without departing from the scope of the invention.

As used herein, the term "short-chain branch (SCB)" in the "olefin-based copolymer" or the "(polymeric) fraction" contained therein may refer to a short chain branching from the longest main chain in each of the polymer chains contained in the olefin-based copolymer or the fraction thereof. The number of the short-chain branches can be calculated by analyzing the "olefin-based copolymer" or the "fraction" thereof by cross-fractionation chromatography (CFC), and it may be proportional to the content of α-olefin monomers contained in the "olefin-based copolymer" or the respective polymer chains.

On the other hand, according to one embodiment of the invention, there is provided an olefin-based copolymer comprising an ethyl repeating unit and an α-olefin-based repeating unit, wherein when the olefin-based copolymer is analyzed by cross-fractionation chromatography (CFC), it includes a first fraction defined as a first peak appearing at a first elution temperature (Te1) of −20° C. to 50° C., a second fraction defined as a second peak appearing at a second elution temperature (Te2) of 50° C. to 85° C., and a third fraction defined as a third peak appearing at a third elution temperature (Te3) higher than that of the second elution temperature (Te2), for example, at a temperature of 85° C. to 130° C. In such olefin-based copolymer, the fraction ratio of the second fraction defined by the integral area of the second peak is 7 to 25%, or the second fraction of the olefin-based copolymer may have the number of short chain branches (SCB) per 1,000 carbon atoms of more than 50.

The present inventors have found that when olefin-based copolymers are prepared using a specific catalyst composition described below, these olefin-based copolymers exhibit novel crystalline structure and properties over previously known olefin-based copolymers, for example, existing olefin-based elastomers including ethylene-alpha-olefin random copolymers, thereby completing the present invention.

The novel crystalline properties of the olefin-based copolymer were confirmed from the results of the cross-fractionation chromatography analysis of the olefin-based copolymer. According to the analysis results, the olefin-based copolymer may exhibit first to third peaks in three different specific temperature ranges. This can define novel crystal structure and properties that are distinguished from those in which conventional ethylene-alpha-olefin random copolymers exhibit only a single peak in the same analysis results.

More specifically, the first to third peaks refer to including fractions of polymer chains exhibiting different crystallinity to the olefin-based copolymer of one embodiment, more specifically, a first fraction exhibiting the lowest crystallinity, a third fraction exhibiting the highest crystallinity, and a second fraction exhibiting crystallinity between the first and third fractions. In this way, as the first to third fractions of the polymer chains having different crystallinity are contained at the same tine, the olefin-based copolymer of one embodiment can simultaneously improve various physical properties required for various applications, for example, compatibility with other resins, processability, strength and impact strength when used singly or compounded with other resins. This is presumably because the olefin-based copolymer simultaneously contains polymer chains exhibiting various crystallinity.

In particular, the olefin-based copolymer of one embodiment may contain a second fraction exhibiting an intermediate level of crystallinity at a specific fraction ratio (fraction percentage). It was confirmed that in the polymer chains contained in such second fraction, alpha-olefin-based repeating units derived from alpha-olefin-based comonomers are contained in a higher content. For reference, this can be confirmed from the analysis result that the number of short chain branches (SCP) per 1,000 carbon atoms contained in the second fraction is 50 or more.

As a result, it was confirmed that the olefin-based copolymer of one embodiment can excellently exhibit various properties at the same time even when used singly, and also can improve strength and impact strength together when compounded with polypropylene comprising propylene, which is a kind of alpha-olefin.

Accordingly, by using the olefin-based copolymer of one embodiment, it is possible to provide a molded article having more excellent physical properties.

Hereinafter, such olefin-based copolymer of one embodiment and the method for preparing the same will be described in more detail.

For the olefin-based copolymer of one embodiment, analysis via the cross-fractionation chromatography can be carried out using Polymer Char's CFC (Cross-Fractionation Chromatography) equipment well-known to those skilled in the art, and the analysis can be carried out with the above equipment by lowering the initial temperature of the solution in which the olefin-based copolymer is dissolved in o-dichlorobenzene or the like up to −20° C. and then elevating the temperature up to 130° C. at a constant temperature raising rate.

As a result of this analysis, the first to third peaks corresponding to the first to third fractions are confirmed in the above-mentioned temperature range, wherein the first peak may be a case where a central peak temperature is −15° C. to 15° C., or −10° C. to 10° C., the second peak may be a case where a central peak temperature is 50° C. to 85° C., or 70° C. to 80° C., and the third peak may be a case where a central peak temperature is 85° C. to 100° C., or 87° C. to 93° C. Here, the central peak temperature may refer to a temperature corresponding to the apex of each peak in the first to third peaks that are confirmed in each temperature range.

Further, based on the integral area of the first to third peaks and the ratio thereof, the fraction ratio can be determined in the entire olefin copolymer of the first to third fraction of the polymer chains exhibiting different crystallinity, and these respective integral areas are derived by dividing the first to third peaks, for example, for each peak area according to a constant temperature region as shown in FIG. 5 and then finding the bottom area thereof. The fraction ratio of each fraction corresponding to each peak can be determined as a ratio of the integral area of each peak to the total area of each peak.

When the olefin-based copolymer of one embodiment is analyzed in this manner, the fraction ratio of the second fraction defined by the integral area of the second peak may be 7 to 25%, or 10 to 23%, or 13 to 20%. As described above, the second fraction of the polymer chains exhibiting an intermediate level of crystallinity is contained in a specific fraction ratio, and the higher content of alpha-olefin based repeating units is contained within the polymer chain of this second fraction. Such olefin-based copolymer of one embodiment can exhibit more improved strength and impact strength when compounded with other resins such as polypropylene.

Further, for the olefin-based copolymer of one embodiment, the fraction ratio first fraction defined by the integral area the first peak may be 50 to 75%, 55 to 70%, or 60 to 70%, and the fraction ratio of the third fraction defined by the integral area of the third peak may be 5 to 25%, or to 23%, or 15 to 22%.

Thus, as a first fraction containing low crystalline polymer chains and a third fraction containing highly crystalline polymer chains are included at a predetermined fraction ratio, the olefin-based copolymer of one embodiment can excellently maintain or improve various physical properties required for olefin-based elastomer simultaneously, for example, compatibility with other resins, processability, strength and impact strength when used singly or compounded with other resins.

On the other hand, the olefin-based copolymer of one embodiment can have a melting point of 100° C. to 140° C., or 110° C. to 130° C., or 115° C. to 128° C., as measured by DSC, thereby exhibiting excellent heat resistance.

Moreover, the second fraction of the olefin copolymer may satisfy the characteristic that the number of short-chain branches (SCB) per 1,000 carbon atoms is 50 or more, or 50 to 70. The number of short-chain branches (SCB) per 1,000 carbon atoms can be calculated by analyzing the olefin-based copolymer with CFC. The number of short-chain branches of the second fraction of such olefin-based copolymer means that it has a greater number of short-chain branches as compared with a conventional polyolefin having the same elution temperature. The fact that the second fraction of such olefin-based copolymer has a eater number of short-chain branches indicates that such second fractions alpha-olefin-based repeating units in a higher content.

The olefin-based copolymer of one embodiment may have a density of 0.85 g/cc to 0.91 g/cc, or 0.86 g/cc to 0.89 g/cc, and a melt index of 0.5 to 3 g/10 min, or 0.7 to 2 g/10 min at 190° C. under a load of 2.16 kg. As such density and melt index ranges are satisfied, the olefin-based copolymer can exhibit appropriate mechanical properties and processability together.

Further, the olefin-based copolymer of one embodiment may have a weight average molecular weight of about 30,000 to 200,000, or about 50,000 to 180,000, and a molecular weight distribution of 2.0 or more, or 2.0 to 4.0, or 2.1 to 3.0. As the olefin-based copolymer has such molecular weight and molecular weight distribution, it can exhibit appropriate properties as an olefin-based elastomer, for example, excellent mechanical properties, processability, and the like.

Meanwhile, the above-mentioned olefin-based copolymer may contain 50 to 90% by weight of an ethylene repeating unit and the remaining amount of an alpha-olefin-based repeating unit.

The olefin-based copolymer may be a copolymer comprising an ethylene-based repeating unit and an alpha-olefin-based repeating unit. In this case, the alpha-olefin-based repeating unit may be a repeating unit derived from an α-olefin, such as 1-butene, 1-pentene, 4-methyl-1-pentene, 1-hexene, 1-heptene, 1-octene, 1-decene, 1-undecene, 1-dodecene, 1-tetradecene, 1-hexadecene, or the like. In consideration of the excellent impact strength, etc. of the olefin-based copolymer, it may be appropriately a repeating unit derived from 1-butene.

The olefin-based copolymer of one embodiment exhibits excellent physical properties required for olefin-based elastomers or the like when used singly, and also exhibits excellent compatibility as well as more improved strength and impact strength when compounded with other resins such as polypropylene. Accordingly, the olefin-based copolymer can overcome the limitations of conventional olefin-based copolymers and olefin-based elastomers, thereby being applied to various fields uses requiring various physical properties.

For example, the olefin-based copolymer can be usefully used for hollow molding, extrusion molding or injection molding in various fields and applications such as various packaging materials, building materials, daily necessities and the like, including automobiles, shoes, electric wires, toys, fibers, medical materials, and the like.

On the other hand, it has been confirmed that the above-mentioned olefin based copolymer can be produced by a preparation method using a specific catalyst system described below. Thus, according to another embodiment of the invention, there is provided a method for preparing the olefin-based copolymer of one embodiment comprising copolymerizing ethylene and α-olefin in the presence of a catalyst composition comprising a first metallocene catalyst including a compound of the following Chemical Formula 1 and a second metallocene catalyst including a compound of the following Chemical Formula 2:

[Chemical Formula 1]

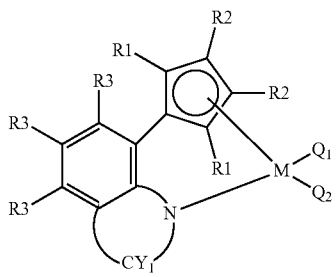

in Chemical Formula 1,

R1 and R2 are each independently hydrogen, an alkyl having 1 to 20 carbon atoms, an aryl having 6 to 20 carbon atoms, silyl, an alkenyl having 1 to 20 carbon atoms, an alkylaryl having 7 to 25 carbon atoms, an arylalkyl having 7 to 25 carbon atoms, or a metalloid radical of a Group 14 metal substituted with hydrocarbyl; the R1 and R2 may be connected to each other by an alkylidene radical containing an alkyl having 1 to 20 carbon atoms or an aryl having from 6 to 20 carbon atoms to form a ring;

each R3 is independently hydrogen, a halogen, an alkyl radical having 1 to 20 carbon atoms, an aryl radical having 6 to 20 carbon atoms, an alkoxy radical having 6 to 20 carbon atoms, an aryloxy radical, amido radical; two or more R3 of the R3 may be connected to each other to form an aliphatic or aromatic ring;

CY1 is a substituted or unsubstituted aliphatic ring;

M is a Group 4 transition metal; and $Q_1$ and $Q_2$ are each independently a halogen, an alkyl radical having 1 to 20 carbon atoms, an aryl amido radical having 6 to 20 carbon atoms, an alkyl radical having 1 to 20 carbon atoms, an alkenyl radical having 1 to 20 carbon atoms, an aryl radical having 6 to 20 carbon atoms, an alkylaryl radical having 7 to 25 carbon atoms, an arylalkyl radical having 7 to 25 carbon atoms, or an alkylidene radical having 1 to 20 carbon atoms,

[Chemical Formula 2]

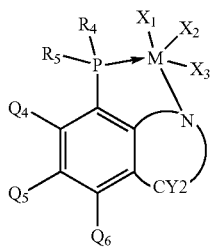

in Chemical Formula 2, $R_4$ and $R_5$ are each independently selected from the group consisting of an alkyl group having 1 to 20 carbon atoms which is substituted or unsubstituted with halogen, a cycloalkyl having 5 to 60 carbon atoms, an aryl having 6 to 60 carbon atoms, cyclodiene group having 5 to 60 carbon atoms, an alkenyl having 2 to 20 carbon atoms, an alkylaryl having 7 to 60 carbon atoms and an arylalkyl having 7 to 60 carbon atoms;

$Q_4$ to $Q_6$ are each independently hydrogen or deuterium;

CY2 is an aliphatic ring having 5 to 20 carbon atoms which contains nitrogen and is substituted or unsubstituted with alkyl having 1 to 5 carbon atoms;

M is Groups 3-12 metal or lanthanide series metal; and $X_1$ to $X_3$ are the same as or different from each other and are each independently selected from the group consisting of a halogen radical, an alkylamido radical having 1 to 20 carbon atoms, an arylamido radical having 6 to 60 carbon atoms, an alkyl radical having 1 to 20 carbon atoms, are alkenyl radical having 2 to 20 carbon atoms, an aryl radical having 6 to 60 carbon atoms, an alkylaryl radical having 7 to 60 carbon atoms, an arylalkyl radical having 7 to 60 carbon atoms and an alkylidene radical having 1 to 20 carbon atoms.

The catalysts of Chemical Formulas 1 and 2 are first synthesized by the applicant of the present invention and applied for a patent. These catalysts are disclosed in Korean Patent Nos. 0820542 and 1310239, respectively. However, it has not been previously disclosed that the olefin-based copolymer of one embodiment having novel crystalline properties and structures can be prepared by using the catalysts of Chemical Formulas 1 and 2 together.

As a result of the continuous experiments made by the present inventors, it was first confirmed that the olefin-based polymers of one embodiment satisfying novel crystalline properties and structure may be produced by using the above two catalysts together.

This is presumably because the first metallocene catalyst of Chemical Formula 1 can mainly polymerize low crystalline polymer chains corresponding to a first fraction, and the second metallocene catalyst of Chemical Formula 2 can mainly polymerize highly crystalline polymer chains corresponding to a third fraction. Furthermore, in the polymerization process using these two catalysts, as chain exchange between polymer chains and exchange of short-chain branches derived from alpha-olefin based comonomers occur, it is considered that the polymer chains having an intermediate level of crystallinity corresponding to the second fraction can be polymerized at a constant fraction ratio. As a result, it is considered that the olefin-based copolymer of one embodiment can be produced.

Meanwhile, in the preparation method of another embodiment, the catalyst composition may further include at least one chain shuttling agent selected from the group consisting of diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminium bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide). By additionally using these chain shuttling agents, chain exchange between polymer chains and exchange of short-chain branches in the above polymerization process can occur more easily. As a result, an olefin copolymer of one embodiment having the above-described crystalline properties and the like can be produced more easily.

The addition amount of such chain shuttling agent may be included in a molar ratio of about 1:10 to 1:1000 with respect to the main catalyst compound of the first and second metallocene catalysts. For example, it may be included in a malar ratio of about 1:10 to 1:500, or about 1:20 to 1:200.

That is, in order to exhibit an effect of a certain level or more due to the chain shuttling agent, the content of the chain shuttling agent may be 1:10 or more in a molar ratio with respect to the main catalyst compound. In consideration of appropriate physical property control of the olefin-based copolymer to be produced and the excellent activity of the main catalyst compound, the chain shuttling agent may be contained at a molar ratio of 1:1000 or less with respect to the main catalyst compound.

Meanwhile, in the catalyst composition, as the first and second metallocene catalysts, catalysts belonging to the categories of Chemical Formulas 1 and 2, or catalysts known in Korean Patent Nos. 0820542 and 1310239 all can be used without particular limitation. However, in order to more effectively achieve the crystalline properties and structure according to one embodiment, the compounds of the following Chemical Formulas 1a and 2a can be preferably used as the first and second metallocene catalysts, respectively.

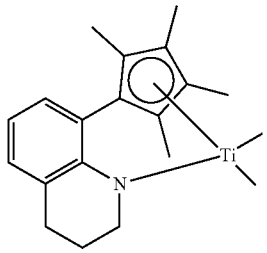
[Chemical Formulas 1a]

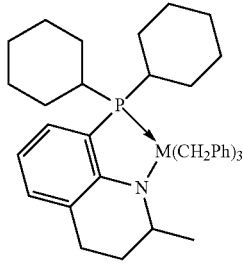
[Chemical Formulas 2a]

More specific details of the first and second metallocene catalysts represented by Chemical Formulas 1 and 2 and their preparation methods are obvious to those skilled in the art through Korean Patent Nos. 0820542 and 1310239, and thus additional explanation relating thereto will be omitted.

In addition, the catalyst composition used in the above preparation method may further include at least one cocatalyst compound selected from the group consisting of the compounds represented by the following Chemical Formulas 3 to 5 in addition to two kinds of the above-described metallocene catalysts:

$J(R^{4'})_3$ [Chemical Formulas 3]

in Chemical Formula 3, J is aluminum or boron, $R^{4'}$ is each independently a halogen, or a hydrocarbyl radical having 1 to 20 carbon atoms which is substituted or unsubstituted with halogen;

$[L-H]^+[ZA_4]^-$ or $[L]^+[ZA_4]^-$ [Chemical Formula 4]

in Chemical Formula 4, L is a neutral or cationic Lewis acid; H is hydrogen; Z is a Group 13 element; each A is independently an aryl having 6 to 20 carbon atoms or an alkyl having 1 to 20 carbon atoms in which one or more hydrogen atoms are substituted with a halogen, a hydrocarbyl having 1 to 20 carbon atoms, an alkoxy group having 1 to 20 carbon atoms or a phenoxy group;

$-[Al(R^{5'})-O]_a-$ [Chemical Formula 5]

in Chemical Formula 5, $R^{5'}$ is a halogen, or a hydrocarbyl having 1 to 20 carbon atoms which is substituted or unsubstituted with halogen; and. a is an integer of 2 or more.

Here, the compound represented by Chemical Formula 3 is not particularly limited as long as it is an alkyl metal compound; and examples thereof include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, or the like.

In addition, the compound represented by Chemical Formula 4 may include triethylammoniumtetra(phenyl)boron, tributylammoniumtetra(phenyl)boron, trimethylammoniumtetra(phenyl)boron, tripropylammoniumtetra(phenyl)boron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetra(pentafluorophenyl)boron, N,N-diethylaniliniumtetra(phenyl)boron, N,N-diethylaniliniumtetra(pentafluorophenyl)boron, diethylammoniumtetra(pentafluorophenyl)boron, trimethylphosphoniumtetra(phenyl)boron, triethylammoniumtetra(phenyl)aluminum, tributylammoniumtetra(phenyl)aluminum, trimethylammoniumtetra(phenyl)aluminum, tripropylammoniumtetra(phenyl)aluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetra(pentafluorophenyl)aluminum, N,N-diethylaniliniumtetra(pheny)laluminum, N,N-diethylaniliniumtetra(phenyl)aluminum, N,N-diethylaniliniumtetra(pentafluorophenyl)aluminum, diethylammoniumtetra(pentafluorophenyl)aluminum, triphenylphosphoniumtetra(phenyl)aluminum, trimethylphosphoniumtetra(pheny)laluminum, triethylammoniumtetra(phenyl)aluminum, tributylammoniumtetra(phenyl)aluminum, tripropylammoniumtetra(p-tolyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetra(pentafluorophenyl)boron, N,N-diethylaniliniumtetra(phenyl)boron, triphenylphosphoniumtetra(phenyl)boron, triphenylcarboniumtetra(p-trifluoromethylphenyl)boron, triphenylcarboniumtetra(pentafluorophenyl)boron, trityltetra (pentafluorophenyl)boron, dimethylaniliniumtetrakis(pentafluorophenyl)borate or trityltetrakis(pentafluorophenyl)borate, or the like.

The compound represented by Chemical Formula 5 is not particularly limited as long as it is alkylaluminoxane; and examples thereof include methyl aluminoxane, ethyl aluminoxane, isobutyl aluminoxane, butyl aluminoxane, or the like.

The addition amount of the above-described cocatalyst compound may be included in a molar ratio of about 1:1 to 1:20 based on the first and second metallocene catalysts. In order to express the effect due to the above-mentioned cocatalyst compound more than a certain level, the content of the cocatalyst compound may be in a molar ratio of 1:1 or more with respect to the main catalyst compound of the first and second metallocene catalysts. Further, in order to control appropriate physical properties of the produced olefin-based copolymer and effectively activate the main catalyst compound, the cocatalyst compound may be included in a molar ratio of 1:20 or less with respect to the main catalyst compound.

Meanwhile, in the preparation method of one embodiment as described above, an olefin-based copolymer can be prepared by a method comprising copolymerizing ethylene and an alpha-olefin-containing monomer in the presence of the above-described catalyst composition. The alpha-olefin monomers that can be used herein include 1-butene, 1-pentene, 4-methyl-1-pentene, 1-hexene, 1-heptene, 1-octene, 1-decene, 1-undecene, 1-dodecene, 1-tetradecene, 1-hexadecene or the like, and 1-butene is more preferred.

Further, the copolymerization step can proceed at a temperature of 120° C. or higher, 120 to 180° C., or 120 to 160° C., and it may proceed under pressure of 50 bar or more, or 50 to 120 bar, or 70 to 100 bar. In the case of previously known metallocene type or post-metallocene type catalysts, it is known that the activity decreases sharply at high temperature. However, the main catalyst compounds of the first and second metallocene catalysts contained in the catalyst composition described above can maintain excellent catalytic activity even under a high temperature of 120° C. or more and a high pressure of 50 bar or more. Therefore, the copolymerization process can be carried out under such high-temperature and high-pressure conditions to obtain an olefin-based copolymer having excellent physical properties with higher efficiency.

The copolymerization step may be carried out by a solution process using the above-described catalyst composition, or it can be carried out by a slurry process or a gas phase process using the catalyst composition together with an inorganic carrier such as silica. Hereinafter, more specific progress conditions and methods of the copolymerization step will be described centering on a continuous type solution polymerization process.

In the copolymerization step, a scavenger may be introduced in the reactor in an amount of 0.4 to 5 times the total content of moisture. Such a scavenger serves to remove impurities such as moisture and air that may be contained in the reactants and can be introduced before the initiation of copolymerization of the reactant. For the mixture of the scavenger and the reactant, the scavenger and the reactant can be mixed in a separate reactor other than a polymerization reactor, and the scavenger and reactant may be mixed for a sufficient time in a feed line where the reactants are fed to the polymerization reactor. Preferred examples of the scavenger include trialkylaluminum such as TiBAl (triisobutylaluminum) or TOA (trioctylaluminum), but are not limited thereto.

In addition, the copolymerization step can be carried out by introduction of the above-described catalyst composition, monomer and scavenger in the reactor.

In this case, the copolymerization step may be dissolved or diluted in an aliphatic hydrocarbon solvent having 5 to 12 carbon atoms suitable for the olefin polymerization process, such as pentane, hexane, heptane, nonane, decane, or an isomer thereof; an aromatic hydrocarbon solvent such as toluene or benzene; or a hydrocarbon solvent substituted with a chlorine atom such as dichloromethane and chlorobenzene, and injected.

In one embodiment in which the copolymerization step proceeds, the molar ratio between ethylene and solvent needs to be a ratio suitable for dissolving the reactant and the resulting olefin-based copolymer. For example, the molar ratio of (ethylene/solvent) may be about 1/10,000 to 10, or about 1/100 to 5, or about 1/20 to 1. By appropriately setting such a molar ratio, the copolymerization step can be effectively carried out, and also the amount of the solvent can be optimized, thereby suppressing an in instruments and an increase in the energy cost due to the purification and recycling of the solvent.

The solvent may be introduced into a reactor at a temperature of about −40 to 150° C. using a heater or a freezes, and the polymerization reaction may be initiated with the monomers and the catalyst composition.

In addition, the large-capacity pump allows the pressure to increase to about 50 bar or more and supply feeds (solvent, monomer, catalyst composition, etc.), and thereby a mixture of the feeds can be passed without additional pumping between the reactor arrangement, the pressure drop device, and the separator.

The olefin-based copolymer produced in the reactor can be maintained at a concentration of less than about 20 mass % in the solvent, and after a short residence time has elapsed, it can be transferred to a primary solvent separation step in order to remove the solvent. An appropriate time for the olefin-based copolymer to stay in the reactor can be from about 1 minute to 10 hours, or from about 3 minutes to 1 hour, or from about 5 minutes to 30 minutes. Thereby, it is possible to suppress a decrease in productivity, a loss of catalyst, etc., and to optimize the size of the reactor.

On the other hand, after the above-described copolymerization step is carried out, in order to remove the solvent present together with the olefin-based copolymer leaving the reactor, a solvent separation step can be further carried out by changing the temperature and pressure of the solution. At this time, the copolymer solution transferred actor maintains a molten state through a heater, and the unreacted feed solvent is vaporized by a separator, and the produced copolymer can be pelletized with an extruder the like.

Advantageous Effects

As described above, according to the present invention, an olefin-based copolymer having novel crystalline properties and capable of providing a molded article with more improved strength and impact strength when used singly or compounded with other resins, and a method for preparing the same can be provided.

BRIEF DESCRIPTION OF DRAWINGS

FIGS. 1 to 3 are graphs showing the results of the cross-fractionation chromatography (CFC) analysis of an olefin-based copolymer of Examples 1 to 3, respectively.

FIG. 4 is a graph showing the results of the cross-fractionation chromatography (CFC) analysis of an olefin-based copolymer of Comparative Example 1.

FIG. 5 is a graph showing a process of obtaining an integral area of each peak corresponding to a fraction ratio of each fraction, from the results of the cross-fractionation chromatography analysis of an olefin-based copolymer according to one embodiment.

FIG. 6 shows what each symbol in FIGS. 1-4 represents.

EXAMPLES

Hereinafter, preferred examples will be set forth for better understanding of the present invention. The following examples are merely illustrative of the present invention, and the scope of the present invention should not be construed to be limited thereby.

In the following examples, organic reagents and solvents were purchased from Aldrich and Merck, and purified by a standard method. In all synthesis steps, the contact between air and moisture were blocked to enhance the reproducibility of experiments. In addition, in the following examples, the term "overnight" means a period of about 12 to 16 hours, and the term "room temperature" refers to a temperature of 20 to 25° C. The synthesis of all the transition metal compounds and the preparation of experiments were carried out using the dry box technique or glass tools maintained in dry condition under the dry nitrogen atmosphere. All the solvents used in the examples were of the HPLC level and dried before use.

Preparation Example 1

Preparation of a First Metallocene Catalyst

A first metallocene catalyst represented by the following Chemical Formula 1a was prepared according to the method of Examples 6 and 7 of Korean Patent No. 0820542.

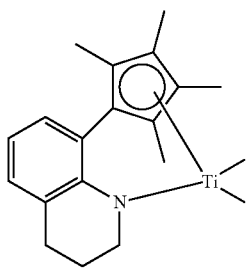

[Chemical Formula 1a]

Preparation Example 2

Preparation of a Second Metallocene Catalyst

A second metallocene catalyst represented by the following Chemical Formula 2a was prepared according to the methods as described below.

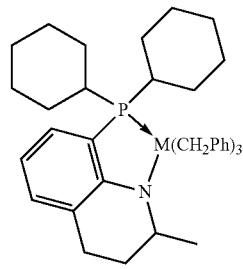

[Chemical Formula 2a]

2-Methyl-1,2,3,4-tetrahydroquinoline (6.12 g, 41.6 mmol) and hexane (0.536 M, 77.5 ml) were added to a 250-ml Schlenk flask. n-BuLi (1.1 eq, 18.3 ml) was added thereto at −20° C. and allowed to stand overnight at room temperature. The mixture was filtered through G4 frit, and dried under vacuum to obtain a lithium salt. The lithium salt (1.83 g, 11.9 mmol) and diethyl ether (0.423 M, 28.2 ml) were added and $CO_2$ bubbling was carried out at −78° C. for 1 hour. The reaction was allowed to proceed overnight at room temperature while slowly raising the temperature, then THF (1.1 eq, 1.07 ml) and t-BuLi (1.1 eq, 8.4 ml) were added at −20° C. and kept for 2 hours. Cyclohexyl$_2$PCl (0.85 eq, 2.36 g) and diethyl ether (0.359 M, 28.2 ml) were added at the same temperature, and then kept at the same temperature for 1 hour. The reaction was allowed to proceed overnight at room temperature while slowly raising the temperature, and then 50 ml of distilled water was added at 0° C., and the mixture was stirred again at room temperature for 30 minutes. After work-up with diethyl ether, the mixture was dried with $MgSO_4$ and subjected to column separation to obtain yellow solid product (1.86 g, yield: 45.3%).

In a 100-ml Schlenk flask, the above-prepared compound (0.28 g, 0.815 mmol), Zr(CH$_2$Ph)$_4$ (1.0 eq, 0.37 g) and toluene (0.154 M, 5.3 ml) were added and the reaction was allowed to proceed overnight at 25° C. After completion of the reaction, toluene was removed and the resultant mixture was extracted with pentane to obtain a yellow solid product (245 mg, yield: 42.5%).

1H NMR (500 MHz, Toluene-d8)

7.15 (m, 5H), 7.02 (m, 9H), 6.86 (t, 3H), 6.67 (t, 3H), 4.15 (s, 1H), 2.73 (m, 1H), 2.62 (d, 2H), 2.56 (d, 2H), 2.42 (m, 1H), 2.17 (d, 1H), 1.82 (d, 1H), 1.62 (m, 10H), 1.40 (m, 1H), 1.14 (m, 6H), 0.99 (m, 6H)

Example 1

Preparation of Ethylene-1-Butene Copolymer

In a 1.5 L autoclave continuous process reactor, a hexane solvent (6.03 kg/h) and 1-butene (0.70 kg/h) were added, and the temperature of the upper end of the reactor was pre-heated to 145° C. A triisobutylaluminum compound (0.03 mmol/min), the first metallocene catalyst (0.4 μmol/min) prepared in Preparation Example 1, the second metallocene catalyst (0.4 μmol/min) prepared in Preparation Example 2, and dimethylanilinium tetrakis(pentafluorophenyl)borate cocatalyst (2.4 μmol/min) were simultaneously introduced into the reactor. Then, ethylene (0.87 kg/h) was introduced in the autoclave reactor, and the reaction mixture was maintained under a pressure of 89 bar at 120° C. for 30 minutes or more, and then a copolymerization reaction was performed in a continuous process to produce an ethylene-1-butene copolymer as an olefin-based copolymer. Next, the remaining ethylene gas was withdrawn and the polymer solution was dried in a vacuum oven for 12 hours or more, and then the physical properties were measured.

Example 2

Preparation of Ethylene-1-Butene Copolymer

In a 1.5 L autoclave continuous process reactor, a hexane solvent (5.86 kg/h) and 1-butene (0.80 kg/h) were added, and the temperature of the upper end of the reactor was pre-heated to 140° C. A triisobutylaluminum compound (0.035 mmol/min), the first metallocene catalyst (0.35 μmol/min) prepared in Preparation Example 1, the second metallocene catalyst (0.35 μmol/min) prepared in Preparation Example 2, and dimethylanilinium tetrakis(pentafluorophenyl)borate cocatalyst (2.1 μmol/min) were simultaneously introduced into the reactor. Then, ethylene (0.87 kg/h) was introduced in the autoclave reactor, and the reaction mixture was maintained under a pressure of 89 bar at 120° C. for 30 minutes or more, and then a copolymerization reaction was performed in a continuous process to produce an ethylene-1-octene copolymer as an olefin-based copolymer. Next, the remaining ethylene gas was withdrawn and the polymer solution was dried in a vacuum oven for 12 hours or more, and then the physical properties were measured.

Example 3

Preparation of Ethylene-1-Butene Copolymer

In a 1.5 L, autoclave continuous process reactor, a hexane solvent (5.86 kg/h) and 1-butene (0.80 kg/h) were added, and the temperature of the upper end of the reactor was pre-heated to 141° C. A triisobutylaluminum compound (0.03 mmol/min), the first metallocene catalyst (0.5 μmol/min) prepared in Preparation Example 1, the second metallocene catalyst (0.5 μmol/min) prepared Preparation Example 2, and dimethylanilinium tetrakis(pentafluorophenyl)borate cocatalyst (1.5 μmol/min) were simultaneously introduced into the reactor. Then, ethylene (0.87 kg/h) was introduced in the autoclave reactor, and the reaction mixture was maintained under a pressure of 89 bar at 120° C. for 30 minutes or more, and then a copolymerization reaction was performed in a continuous process to produce an ethylene-1-octene copolymer as an olefin-based copolymer. Next, the remaining ethylene gas was withdrawn and the polymer solution was dried in a vacuum oven for 12 hours or more, and then the physical properties were measured.

Comparative Example 1

An olefin-based elastomer commercial product (trade name: LC175; ethylene-1-butene random copolymer) from LG Chem. Ltd. was used as Comparative Example 1.

Method for Measuring Physical Properties

The physical properties of the respective olefin-based copolymers of Examples 1 to 3 and Comparative Example 1 were measured and evaluated by the methods described below.

1) CFC Analysis and Calculation of Integral Area of Each Peak

CFC (Cross-Fractionation Chromatography) equipment from Polymer Char was used, and the measurement was carried out in the range of −20° C. to 130° C. using o-dichlorobenzene as a solvent. Specifically, a copolymer sample was dissolved in an o-dichlorobenzene solvent concentration of 5.0% w/v at 130° C. and the resultant solution was cooled up to −20° C. at a rate of 0.50° C./min. Then, the temperature was increased by heating from −20° C. to 130° C. at a heating rate of 1° C./min, and the concentration of an eluted polymer was measured while flowing the o-dichlorobenzene solvent in the column at the flowing rate of 0.5 mL/min.

Through such measurement and analysis, the analytical results as shown in FIGS. 1 to 4 were derived for Examples 1 to 3 and Comparative Example 1, and the central peak temperature of each peak was measured and the results are summarized in Table 1 below.

In addition, as shown in FIG. 5, a peak area for each peak was obtained, and a lower area of each peak was obtained, thereby calculating the integral area and fraction ratio of each peak. The results are summarized in Table 1 together.

2) Analysis on the Number of Short-Chain Branches (SCB) Per 1,000 Carbon Atoms

Each copolymer was analyzed by CFC to derive a distribution curve showing the number of short-chain branches per 1,000 carbon atoms according to the molecular weight of the polymer chains. For reference, as shown in FIGS. 1 to 4 and summarized in the following explanatory notes, when each copolymer was analyzed by CFC, the value of —$CH_3$ per 1,000 carbon atoms can be automatically calculated together with the molecular weight, and the number of short-chain branches per 1,000 carbon atoms can be calculated from the value —$CH_3$ per 1,000 carbon atoms.

In the explanatory notes above, "wt % (interpolated)" represents the cumulative amount of the polymer by elution temperature contained in the copolymer and each fraction, "dW/dT" is a graph showing the content (concentration) of the polymer eluted at each elution temperature (a graph for identifying/deriving the first to third peaks and the like of one embodiment), "Log (Mw)" represents a Log value of the molecular weight of the polymer eluted at each elution temperature, and "$CH_3$/1000 C" represents a value of —$CH_3$ per 1000 carbon atoms (the number of short-chain branches per 1000 carbon atoms).

In this manner, the number of short-chain branches per 1,000 carbon atoms was calculated for the second fraction of Examples 1 to 3 and Comparative Example 1 (in Comparative Example 1, a fraction corresponding to a single peak), and the calculated results are shown together in FIGS. 1 to 4. The average number of short-chain branches of each copolymer was calculated and shown in Table 1.

3) Melt Index (MI)

The melt index (MI) of the copolymers of Examples 1 to 3 and Comparative Example 1 was measured according to ASTM D-1238 (condition E, 190° C., load of 2.16 kg) using D4002HV instrument from Dynisco.

4) Density

For the copolymers of Examples 1 to 3 and Comparative Example 1, the density was measured at a temperature of 23° C. according to ASTM D1505 standard using an XS104 instrument from Mettler Toledo.

5) Melting Point (Tm)

The temperature was maintained at 30° C. for 1 minute, and then increased to 200° C. at a rate of 20° C./min and maintained at that temperature for 2 minutes. Then, the temperature was decreased to −100° C. at a rate of 10° C./min and maintained at that temperature for 1 minute. Then, the temperature was increased again to 200° C. at a rate of 10° C./min, and the apex of DSC (Differential Scanning calorimeter, Q100 manufactured by TA) curve was determined as the melting point. The melting point was measured in a section where a second temperature increases, and the measurement results were used.

6) Weight Average Molecular Weight and Molecular Weight Distribution (Polydispersity: PDI)

Each of a number average molecular weight (Mn) and a weight average molecular weight (Mw) was measured using gel permeation chromatography (GPC), and the weight average molecular weight was divided by the number average molecular weight to calculate molecular weight distribution.

The physical properties of the copolymers of Examples 1 to 3 and Comparative Example 1, which were measured by the above method, are summarized in Table 1 below.

Shrinkage (%)=[(measured length−130)/130]*100

TABLE 2

| Sample | Comparative Example 1 | Example 3 |
|---|---|---|
| Flexural strength (kgf/cm$^2$) | 245 | 251 |
| Flexural modulus (Secant 1%) (kgf/cm$^2$) | 8103 | 8437 |
| Tensile strength (kgf/cm$^2$) | 185 | 188 |
| Low-temperature impact strength (−20° C.) (kgf · m/m) | 7.13 | 8.00 |

TABLE 1

| | MI (g/10 min) | Density (g/cc) | Mw | PDI | Second fraction SCB (average number) | Melting point (° C.) | First peak Central peak temperature (° C.) | First peak Fraction ratio (%) | Second peak Central peak temperature (° C.) | Second peak Fraction ratio (%) | Third peak Central peak temperature (° C.) | Third peak Fraction ratio (%) |
|---|---|---|---|---|---|---|---|---|---|---|---|---|
| Example 1 | 1.0 | 0.873 | Not measured | Not measured | 50 | 123.3 | 2.5 | 64.6 | 75 | 19.1 | 89.0 | 16.2 |
| Example 2 | 2.0 | 0.872 | Not measured | Not measured | 59.8 | 122.8 | −7.9 | 60.9 | 80.1 | 17.6 | 88.9 | 21.4 |
| Example 3 | 1.3 | 0.870 | 100656 | 2.31 | 58.6 | 122.2 | −6.0 | 67.4 | 52.0 | 15.0 | 89.1 | 17 |
| Comparative Example 1 | 1.1 | 0.868 | 86890 | 2.15 | 45 | 42 | 14.4 | 100 | * only single peak exists | | | |

Referring to Table 1 and FIGS. 1 to 4, it was confirmed that when analyzed by cross-fractionation chromatography, the copolymers of Examples 1 to 3 exhibited three peaks at a predetermined temperature and satisfied novel crystalline structure and properties that the fraction ratio of the second fraction corresponding to the second peak is in the range of 7 to 25%. In contrast, in the case of Comparative Example 1, only a single peak was confirmed.

Test Example 20 wt % of the olefin-based copolymer of Example 3 or Comparative Example 1 and 80 wt % of polypropylene (trade name: M1600, LG Chem. Ltd.) were mixed to prepare a specimen. More specifically, first, the above components were homogeneously mixed using a Henschel mixer, and then pelletized with a co-rotating twin screw extruder and the specimen for measuring physical properties was prepared using an injection machine.

For these specimens, the flexural strength, flexural modulus, tensile strength, impact strength at low temperature and normal temperature, and shrinkage were measured by the following methods, and the results are summarized in Table 2 below.

1) Flexural strength and flexural modulus: measured according to ASTM D 790 standard using an INSTRON 3365 instrument.

2) Tensile strength: measured according to ASTM D 639 standard using an INSTRON 4465 instrument.

3) Normal-temperature Izod impact strength (IZOD, @ 23° C.): measured under the conditions of ASTM D 256, ¼", 23±5° C.

4) Low-temperature Izod impact strength (IZOD, @ −30° C.): measured under the conditions of ASTM D 256, ¼", −20±5° C.

5) Shrinkage: The specimens were prepared by injection molding through a mold having a length of 130 mm and then stored at room temperature for 12 hours. After 12 hours, the length of the specimens was measured and then the shrinkage percentage was calculated according to the following Equation.

TABLE 2-continued

| Sample | Comparative Example 1 | Example 3 |
|---|---|---|
| Normal-temperature impact strength (23° C.) (kgf · m/m) | 61.88 | 64.51 |
| Shrinkage (¹/₁₀₀₀) | 13.4 | 13.9 |

Referring to Table 2 above, it was confirmed that the specimen containing the copolymer of Example 3 exhibited more improved impact strength and tensile strength while other physical properties were equal to or higher than those of the specimen containing the copolymer of Comparative Example 1.

The invention claimed is:

1. An olefin-based copolymer comprising an ethylene repeating unit and an α-olefin-based repeating unit,
   wherein when the olefin-based copolymer is analyzed by cross-fractionation chromatography (CFC), it includes
   a first fraction defined as a first peak appearing at a first elution temperature (Te1) of −20° C. to 50° C.,
   a second fraction defined as a second peak appearing at a second elution temperature (Te2) of 50° C. to 85° C., and
   a third fraction defined as a third peak appearing at a third elution temperature (Te3) of a temperature of 85° C. to 130° C.,
   and wherein the fraction ratio of the second fraction defined by the integral area of the second peak is 7 to 25%.

2. The olefin-based copolymer according to claim 1, wherein the central peak temperature of the second peak of the olefin-based copolymer is 70° C. to 80° C.

3. The olefin-based copolymer according to claim 1, wherein the central peak temperature of the first peak of the olefin-based copolymer is −15° C. to 15° C., and the fraction ratio of the first fraction defined by the integral area of the first peak is 50 to 75%.

4. The olefin-based copolymer according to claim 1, wherein the central peak temperature of the third peak is 85° C. to 100° C., and the fraction ratio of the third fraction defined by the integral area of the third peak is 5 to 25%.

5. The olefin-based copolymer according to claim 1, wherein the third fraction has a crystallinity higher than that of the second fraction, and the second fraction has a crystallinity higher than that of the first fraction.

6. The olefin-based copolymer according to claim 1, wherein it has a melting point of 100° C. to 140° C. as measured by DSC.

7. The olefin-based copolymer according to claim 1, wherein the second fraction of the olefin-based copolymer has the number of $CH_3$ per 1,000 carbon atoms of more than 50.

8. The olefin-based copolymer according to claim 1, wherein it has a density of 0.85 g/cc to 0.91 g/cc.

9. The olefin-based copolymer according to claim 1, wherein it has a melt index of 0.5 to 3 g/10 min at 190° C. under a load of 2.16 kg.

10. The olefin-based copolymer according to claim 1, wherein it contains 50 to 90% by weight of an ethylene repeating unit and the remaining amount of an alpha-olefin-based repeating unit.

11. The olefin-based copolymer according to claim 1, wherein the α-olefin repeating unit is a repeating unit derived from at least one α-olefin selected from the group consisting of 1-butene, 1-pentene, 1-hexene, 1-heptene, 1-octene, 1-decene, 1-undecene, 1-dodecene, 1-tetradecene and 1-hexadecene.

12. An olefin-based copolymer containing an ethylene repeating unit and an α-olefin-based repeating unit,
wherein when the olefin-based copolymer is analyzed by cross-fractionation chromatography (CFC), it includes
a first fraction defined as a first peak appearing at a first elution temperature (Te1) of −20° C. to 50° C.,
a second fraction defined as a second peak appearing at a second elution temperature (Te2) of 50° C. to 85° C., and
a third fraction defined as a third peak appearing at a third elution temperature (Te3) higher than that of the second elution temperature (Te2), and
wherein the second fraction of the olefin-based copolymer has the number of —$CH_3$ per 1,000 carbon atoms of more than 50.

13. A method for preparing the olefin-based copolymer of claim 1 comprising copolymerizing ethylene and α-olefin in the presence of a catalyst composition comprising a first metallocene catalyst including a compound of the following Chemical Formula 1 and a second metallocene catalyst including a compound of the following Chemical Formula 2:

[Chemical Formula 1]

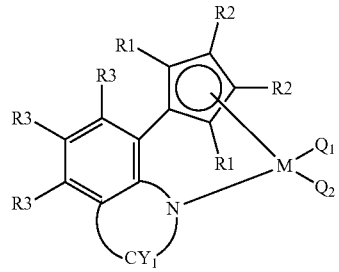

in Chemical Formula 1,
R1 and R2 are each independently hydrogen, an alkyl having 1 to 20 carbon atoms, an aryl having 6 to 20 carbon atoms, silyl, an alkenyl having 1 to 20 carbon atoms, an alkylaryl having 7 to 25 carbon atoms, an arylalkyl having 7 to 25 carbon atoms, or a metalloid radical of a Group 14 metal substituted with hydrocarbyl; and
the R1 and R2 are optionally connected to each other by an alkylidene radical containing an alkyl having 1 to 20 carbon atoms or an aryl having from 6 to 20 carbon atoms to form a ring;
each R3 is independently hydrogen, a halogen, an alkyl radical having 1 to 20 carbon atoms, an aryl radical having 6 to 20 carbon atoms, an alkoxy radical having 6 to 20 carbon atoms, an aryloxy radical, or an amido radical; and
two or more the R3 are optionally connected to each other to form an aliphatic or aromatic ring;
CY1 is a substituted or unsubstituted aliphatic or aromatic ring;
M is a Group 4 transition metal; and
$Q_1$ and $Q_2$ are each independently a halogen, an alkyl radical having 1 to 20 carbon atoms, an aryl amido radical having 6 to 20 carbon atoms, an alkyl radical having 1 to 20 carbon atoms, an alkenyl radical having 1 to 20 carbon atoms, an aryl radical having 6 to 20 carbon atoms, an alkylaryl radical having 7 to 25 carbon atoms, an arylalkyl radical having 7 to 25 carbon atoms, or an alkylidene radical having 1 to 20 carbon atoms,

[Chemical Formula 2]

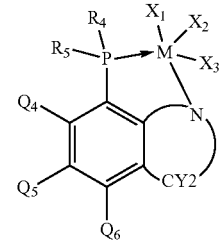

in Chemical Formula 2,
$R_4$ and $R_5$ are each independently selected from the group consisting of an alkyl group having 1 to 20 carbon atoms which is substituted or unsubstituted with halogen, a cycloalkyl having 5 to 60 carbon atoms, an aryl having 6 to 60 carbon atoms, a cyclodiene group having 5 to 60 carbon atoms, an alkenyl having 2 to 20 carbon atoms, an alkylaryl laving 7 to 60 carbon atoms and an arylalkyl having 7 to 60 carbon atoms;
$Q_4$ to $Q_6$ are each independently hydrogen or deuterium;
CY2 is an aliphatic ring having 5 to 20 carbon atoms which contains nitrogen and is substituted or unsubstituted with alkyl having 1 to 5 carbon atoms;
M is Groups 3-12 metal or lanthanide series metal; and
$X_1$ to $X_3$ are the same as or different from each other and are each independently selected from the group consisting of a halogen radical, an alkylamido radical having 1 to 20 carbon atoms, an arylamido radical having 6 to 60 carbon atoms, an alkyl radical having 1 to 20 carbon atoms, an alkenyl radical having 2 to 20 carbon atoms, an aryl radical having 6 to 60 carbon atoms, an alkylaryl radical having 7 to 60 carbon atoms, an arylalkyl radical having 7 to 60 carbon atoms and an alkylidene radical having 1 to 20 carbon atoms.

14. The method for preparing the olefin-based copolymer according to claim 13, wherein the catalyst composition further includes at least one chain shuttling agent selected from the group consisting of diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminium bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide), ethylzinc (2,6-diphenylphenoxide), and ethylzinc (t-butoxide).

15. The method for preparing the olefin-based copolymer according to claim 13, wherein the first metallocene catalyst comprises a compound of the following Chemical Formula 1a, and the second metallocene catalyst comprises a compound of the following Chemical Formula 2a:

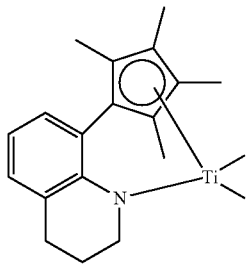

[Chemical Formulas 1a]

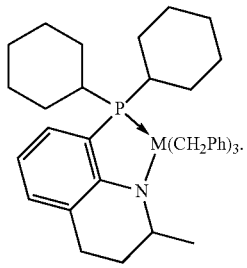

[Chemical Formulas 2a]

16. The method for preparing the olefin-based copolymer according to claim 13, wherein the catalyst composition further comprises at least one cocatalyst compound selected from the group consisting of the compounds represented by the following Chemical Formulas 3 to 5:

$$J(R^4)_3 \qquad \text{[Chemical Formulas 3]}$$

in Chemical Formula 3, J is aluminum or boron; and $R^{4'}$ is each independently a halogen, or a hydrocarbyl radical having 1 to 20 carbon atoms which is substituted or unsubstituted with halogen;

$$[L-H]^+[ZA_4]^- \text{ or } [L]^+[ZA_4]^- \qquad \text{[Chemical Formula 4]}$$

in Chemical Formula 4, L is a neutral or cationic Lewis acid; H is hydrogen; Z is a Group 13 element and each A is independently an aryl having 6 to 20 carbon atoms or an alkyl having 1 to 20 carbon atoms in which one or more hydrogen atoms are substituted with a halogen, a hydrocarbyl having 1 to 20 carbon atoms, an alkoxy group having 1 to 20 carbon atoms or a phenoxy group;

$$-[Al(R^{5'})-O]_a- \qquad \text{[Chemical Formula 5]}$$

in Chemical Formula 5, $R^{5'}$ is a halogen, or a hydrocarbyl having 1 to 20 carbon atoms which is substituted or unsubstituted with halogen; and a is an integer of 2 or more.

17. The method for preparing the olefin-based copolymer according to claim 16, wherein the cocatalyst compound is included in a molar ratio of about 1:1 to 1:20 based on the total amount of the first and second metallocene catalysts.

18. The method for preparing the olefin-based copolymer according to claim 14, wherein the chain shutting agent is included in a molar ratio of about 1:10 to 1:1000 with respect to the total amount of the first and second metallocene catalysts.

19. The method for preparing the olefin-based copolymer according to claim 13, wherein the copolymerization is conducted at a temperature of 120° C. or higher, and under pressure of 50 bar or more.

20. The olefin-based copolymer according to claim 1, wherein it has a weight average molecular weight of about 30,000 to 200,000 g/mol, and a molecular weight distribution of 2.0 or more.

\* \* \* \* \*